United States Patent
Lee

(10) Patent No.: US 11,189,276 B2
(45) Date of Patent: Nov. 30, 2021

(54) VEHICLE AND CONTROL METHOD THEREOF

(71) Applicants: Hyundai Motor Company, Seoul (KR); Kia Motors Corporation, Seoul (KR)

(72) Inventor: Kyung Chul Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 16/265,723

(22) Filed: Feb. 1, 2019

(65) Prior Publication Data

US 2020/0152188 A1 May 14, 2020

(30) Foreign Application Priority Data

Nov. 8, 2018 (KR) .................. 10-2018-0136845

(51) Int. Cl.
*G10L 15/22* (2006.01)
*H04M 1/60* (2006.01)

(52) U.S. Cl.
CPC ........... *G10L 15/22* (2013.01); *H04M 1/6083* (2013.01); *G10L 2015/223* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0049860 A1* | 3/2005 | Junqua | ................. | H04M 1/271 704/231 |
| 2009/0249323 A1* | 10/2009 | Nixon | ................. | H04M 1/6075 717/173 |
| 2013/0166280 A1* | 6/2013 | Quast | ................. | G06F 16/24 704/9 |
| 2014/0025380 A1* | 1/2014 | Koch | ................. | G10L 15/1822 704/257 |
| 2017/0294188 A1* | 10/2017 | Hayakawa | .............. | G10L 15/01 |
| 2017/0351532 A1* | 12/2017 | Li | ................. | G06F 9/4843 |
| 2018/0032526 A1* | 2/2018 | Cudak | ................. | H04L 63/123 |

* cited by examiner

Primary Examiner — Mark Villena
(74) Attorney, Agent, or Firm — Morgan, Lewis & Bockius LLP

(57) ABSTRACT

A vehicle includes a communication device configured to communicate with a terminal capable of providing a communication function; a sensor configured to receive voice of a user; a storage configured to store a user pattern related to a call pattern of the user; and a controller configured to search for at least one name candidate corresponding to input voice when receiving the input voice, determine a threshold for a confidence score of the at least one name candidate based on the user pattern, and select a name corresponding to the input voice from among the at least one name candidate based on the determined threshold.

20 Claims, 10 Drawing Sheets

| PRIORITY | NAME | CONFIDENCE SCORE |
|---|---|---|
| 1 | James | X1 |
| 2 | Jason | X2 |
| 3 | Jameson | X3 |
| 4 | Jaden | X4 |
| 5 | Jane | X5 |
| 6 | Mason | X6 |
| 7 | Jeremy | X7 |
| 8 | Jade | X8 |
| 9 | Johnson | X9 |
| 10 | John | X10 |

FIG.4

| PRIORITY | NAME | CONFIDENCE SCORE |
|---|---|---|
| 1 | James | X1 |
| 2 | Jason | X2 |
| 3 | Jameson | X3 |
| 4 | Jaden | X4 |
| 5 | Jane | X5 |
| 6 | Mason | X6 |
| 7 | Jeremy | X7 |
| 8 | Jade | X8 |
| 9 | Johnson | X9 |
| 10 | John | X10 |

FIG. 5

| PRIORITY | NAME | CONFIDENCE SCORE |
|---|---|---|
| 1 | James | 5560 |
| | | ↕ T3 |
| 2 | Jason | 4980 |
| 3 | Jameson | 4820 |
| 4 | Jaden | 4690 |
| 5 | Jane | 4370 |
| 6 | Mason | 3910 |
| 7 | Jeremy | 3640 |
| 8 | Jade | 3390 |
| 9 | Johnson | 2950 |
| 10 | John | 2860 |

INCREASE T1
INCREASE T2
REDUCE T3 →

T2 : 5500
⇐
T2 : 5000

T1 : 4000
⇐
T1 : 3000

| PRIORITY | NAME | CONFIDENCE SCORE |
|---|---|---|
| 1 | James | 5560 |
| | | ↕ T3 |
| 2 | Jason | 4980 |
| 3 | Jameson | 4820 |
| 4 | Jaden | 4690 |
| 5 | Jane | 4370 |
| 6 | Mason | 3910 |
| 7 | Jeremy | 3640 |
| 8 | Jade | 3390 |
| 9 | Johnson | 2950 |
| 10 | John | 2860 |

FIG. 6

| NAME | CATEGORY | CONFIDENCE SCORE | FIRST THRESHOLD | SECOND THRESHOLD | THIRD THRESHOLD | RECOMMENDED ACTION | WHETHER TO DO |
|---|---|---|---|---|---|---|---|
| HONGGIL DONG | MOBILE | 5100 | 3000 | 5000 | 500 | Direct Call | YES |
| HONGGIL DONG | MOBILE | 5100 | 3500 | 5000 | 500 | Direct Call | NO |
| HONGGIL DONG | MOBILE | 5100 | 4000 | 5000 | 500 | Direct Call | YES |

VEHICLE AND CONTROL METHOD THEREOF

CROSS-REFERENCE TO RELATED APPLICATION

This application is based on and claims the benefit of priority to Korean Patent Application No. 10-2018-0136845 filed on Nov. 8, 2018, in the Korean Intellectual Property Office, the disclosure of which is incorporated herein by reference in its entirety.

TECHNICAL FIELD

The present disclosure relates to a vehicle and control method thereof, capable of recognizing a user's voice and performing a particular function based on the voice recognition.

BACKGROUND

With the development of technologies of vehicle, vehicles offer various functions for user convenience in addition to a basic driving function.

As the function that may be performed by the vehicle is diversified, there are increasing loads to be manipulated by the user, which distracts user's attention while driving and thus threatens safe driving.

Accordingly, research and development for a user interface to reduce such loads to be manipulated by the user is required. Especially, a voice recognition technology that recognizes the user's voice and performs a function corresponding to the voice is expected to effectively reduce the loads to be manipulated by the user when applied for the vehicle.

SUMMARY

The present disclosure provides a vehicle and control method thereof, capable of recognizing voice of a user and providing a function corresponding to the voice of the user.

In accordance with an aspect of the present disclosure, a vehicle includes a communication device configured to communicate with a terminal capable of providing a communication function; a voice input device configured to receive voice of a user; a storage configured to store a user pattern related to a call pattern of the user; and a controller configured to search for at least one name candidate corresponding to an input voice when receiving the input voice, determine a threshold for a confidence score of the at least one name candidate based on the user pattern, and select a name corresponding to the input voice from among the at least one name candidate based on the determined threshold.

The controller may receive phone book information and call history information from the terminal, and create a user pattern based on the received phone book information and call history information.

The controller may select a name corresponding to the input voice from among name candidates, each of which has a confidence score exceeding a first threshold.

The controller may, when there is one name candidate with a confidence score exceeding the first threshold, determine whether the confidence score of the one name candidate exceeds a second threshold, and when the confidence score of the one name candidate exceeds the second threshold, select the one name candidate as a name corresponding to the input voice.

The controller may, when the confidence score of the one name candidate exceeding the first threshold does not exceed the second threshold, ask the user to confirm the one name candidate.

The controller may, when there are a plurality of name candidates, each of which has a confidence score exceeding the first threshold, determine priorities of the plurality of name candidates based on confidence scores of the plurality of name candidates, compare a difference in confidence score between a name candidate with a first priority and a name candidate with a second priority to a third threshold, and select a name corresponding to the input voice based on the comparison.

The controller may, when the difference in confidence score between the name candidate with the first priority and the name candidate with the second priority exceeds the third threshold, select the name candidate with the first priority as a name corresponding to the input voice.

The controller may, when the difference in confidence score between the name candidate with the first priority and the name candidate with the second priority does not exceed the third threshold, ask the user to confirm the name candidate with the first priority.

The controller may search the phone book information of the terminal, when the phone book information is received, for at least one name candidate corresponding to the input voice, and change at least one of a first threshold, a second threshold, or a third threshold based on the number of the at least one name candidate searched for.

The controller may, when the number of at least one name candidate searched for does not exceed a preset first reference number, increase the second threshold and reduce the third threshold.

The controller may determine the number of categories for the at least one name candidate searched for from the phone book, and change at least one of the first, second, and third thresholds based on the number of categories.

The controller may, when the number of categories does not exceed a preset second reference number, increase the second threshold and reduce the third threshold.

The controller may control the communication device to send a control command on the selected name to the terminal.

In accordance with another aspect of the present disclosure, a control method of a vehicle includes receiving voice of a user; searching for at least one name candidate corresponding to input voice when receiving the input voice; determining a threshold for a confidence score of the at least one name candidate based on a user pattern; and selecting a name corresponding to the input voice from among the at least one name candidate based on the determined threshold.

The control method may further include receiving phone book information and call history information from a terminal, and creating a user pattern based on the received phone book information and call history information.

The selecting of the name corresponding to the input voice from among the at least one name candidate based on the determined threshold may include selecting a name corresponding to the input voice from among name candidates, each of which has a confidence score exceeding a first threshold.

The selecting of the name corresponding to the input voice from among the at least one name candidate based on the determined threshold may include, when there is one name candidate with a confidence score exceeding the first threshold, determining whether the confidence score of the one name candidate exceeds a second threshold, and when the confidence score of the one name candidate exceeds the second threshold, selecting the one name candidate as a name corresponding to the input voice.

The control method may further include, when the confidence score of the one name candidate exceeding the first threshold does not exceed the second threshold, asking the user to confirm the one name candidate.

The selecting of the name corresponding to the input voice from among the at least one name candidate based on the determined threshold may include, when there are a plurality of name candidates, each of which has a confidence score exceeding the first threshold, determining priorities of the plurality of name candidates based on the confidence scores of the plurality of name candidates; comparing a difference in confidence score between a name candidate with a first priority and a name candidate with a second priority to a third threshold; and selecting a name corresponding to the input voice based on the comparison.

The selecting of the name corresponding to the input voice from among the at least one name candidate based on the determined threshold may include, when the difference in confidence score between the name candidate with the first priority and the name candidate with the second priority exceeds the third threshold, selecting the name candidate with the first priority as a name corresponding to the input voice.

The selecting of the name corresponding to the input voice from among the at least one name candidate based on the determined threshold may include, when the difference in confidence score between the name candidate with the first priority and the name candidate with the second priority does not exceed the third threshold, asking the user to confirm the name candidate with the first priority.

The searching for the at least one name candidate may include searching phone book information of the terminal, when the phone book information is received, for at least one name candidate corresponding to the input voice; determining a threshold for a confidence score of the at least one name candidate based on a user pattern; and changing at least one of a first threshold, a second threshold, and a third threshold based on the number of the at least one name candidate searched for.

The changing of the at least one of a first threshold, a second threshold, and a third threshold based on the number of the at least one name candidate searched for may include, when the number of the at least one name candidate searched for does not exceed a preset first reference number, increasing the second threshold and reducing the third threshold.

The determining of the threshold for a confidence score of the at least one name candidate based on a user pattern may include determining the number of categories for the name candidate searched for from the phone book, and changing at least one of the first, second, and third thresholds based on the number of categories. The changing of the at least one of a first threshold, a second threshold, and a third threshold may include, when the number of categories does not exceed a preset second reference number, increasing the second threshold and reducing the third threshold.

The control method may further include sending a control command on the selected name to the terminal.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIGS. 4 and 5 show exemplary recognition results, according to an embodiment of the present disclosure;

FIG. 6 shows exemplary user patterns, according to an embodiment of the present disclosure;

DETAILED DESCRIPTION

Figure 1:
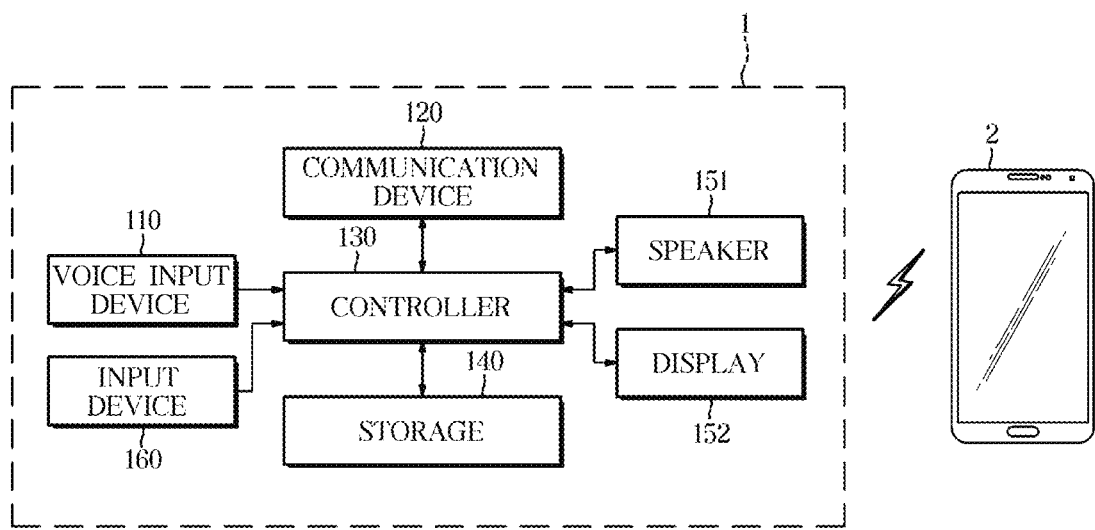
FIG. 1 is a control block diagram of a vehicle, according to an embodiment of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present disclosure will now be described with reference to accompanying drawings.

Figure 2:
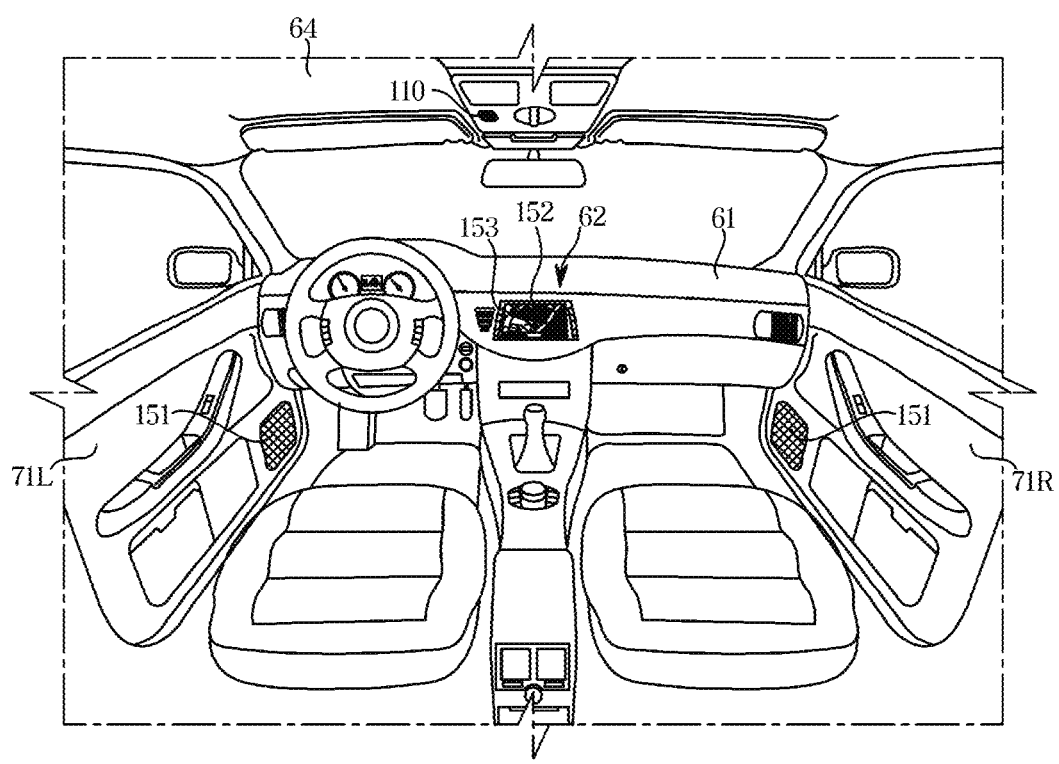
FIG. 2 shows internal features of a vehicle, according to an embodiment of the present disclosure.

FIG. 1 is a control block diagram of a vehicle, according to an embodiment of the present disclosure, and FIG. 2 shows internal features of a vehicle, according to an embodiment of the present disclosure.

Referring to FIGS. 1 and 2, the vehicle 1 in accordance with an embodiment may include a voice input device 110, a communication device 120, a speaker 151, a display 152, a controller 130, a storage 140, and an input device 160.

The vehicle 1 may receive a voice of a control command from the user through the voice input device 110. The voice input device 110 may be a sensor, and may convert an input voice to an electric signal and outputs the electric signal. For this, the voice input device 110 is a hardware device and may be implemented by a microphone, without being limited to.

To receive voice more effectively, the voice input device 110 may be mounted on a headlining 64, as shown in FIG. 2, or on a dashboard 61 or a steering wheel 65, without being limited thereto. Besides, the voice input device 110 may be installed at any place that is suitable to receive voice of a user.

The communication device 120 may be a hardware device implemented with various electronic circuits to transmit and receive signals via wireless or landline connections.

The communication device 120 may communicate with an external server or a terminal 2. The communication device 120 may exchange various kinds of information with the terminal 2. Specifically, the communication device 120 may receive phone book information and call history information from the terminal 2. The phone book information may include names, phone numbers by name, favorite settings by name, and categories by name. The categories by name refer to types of phone numbers by name, and for example, may include at least one of 'mobile', 'home', and 'office'.

The call history information may include information about names, sent and received calls by name, and time of sent and received calls by name. The call history information may be listed in a time sequence from the most recent call. Lists of the call history information may be divided into sent calls and received calls, separately, or may be listed in the time sequence regardless of whether the call is a sent call or a received call.

The terminal 2 refers to a device capable of performing communication. The terminal 2 may be implemented by a computer or portable terminal that may be able to access the vehicle 1 over a network. The computer may include e.g., a notebook, laptop, tablet personal computer (tablet PC), slate PC, etc., having a WEB browser installed therein, and the portable terminal may be a wireless communication device that guarantees portability and mobility, including any type of handheld based wireless communication device, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000 device, a Code Division Multiple Access (CDMA)-2000 device, a W-CDMA device, a Wireless Broadband Internet (WiBro) terminal, a smart phone, etc., and a wearable device, such as a watch, a ring, a bracelet, a necklace, glasses, a contact lens, a head mounted device (HMD), etc.

The communication device 120 may include one or more communication modules that enable communication with an external device, for example, at least one of a short-range communication module, a wired communication module, and a wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (Wibro) module, and/or any wireless communication device for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may include an antenna, a transmitter, and a receiver for signal transmission and reception.

Furthermore, the wireless communication module may include a signal conversion module for modulating a digital control signal to an analog radio signal and demodulating a received analog radio signal into a digital control signal through the wireless communication interface.

The communication device 120 may further include a local communication module for communication between electronic devices in the vehicle 1. The local communication of the vehicle 1 may use a protocol, such as Controller Area Network (CAN), Local Interconnection Network (LIN), FlexRay, Ethernet, etc.

The communication device 120 may exchange data with an external server through a wireless communication module, or with a mobile device through a short-range communication module or wired communication module.

A center fascia 62 located in the center area of the dashboard 61 of the vehicle 1 may have the display 152 for displaying screens required to perform control over the vehicle including audio playing, video playing, navigation, or calling functions, and the input device 160 for receiving a control command from the user. The display 152 may be implemented with one of various displays such as a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc.

The input device 160 may be manipulated by the user to enter a command to control the vehicle 1. The input device 160 may be implemented in a hard key type in an area adjacent to the display 152, as shown in FIG. 2. If the display 152 is implemented in a touch screen type, the display 152 may also serve as the input device 160.

The input device 160 may also be provided on the steering wheel to allow the driver to enter a command to control the vehicle 1 without taking his/her hand(s) off from the steering wheel.

Furthermore, the input device 160 may be provided in a center input device 43 of a jog shuttle type or a hard key type, and may include any component that may enter a command related to control over the vehicle 1.

The vehicle 1 may be equipped with the speaker 151 for outputting sounds required to provide a service desired by the user. For example, the speaker 151 may be provided on the inside of a door 71L on the side of the driver's seat or a door 71R on the side of the passenger's seat.

The speaker 151 may output sounds for supporting a calling function, supporting navigation directions, sounds included in audio/video content, sounds for providing information or services desired by the user, sounds created in response to words spoken by a user, etc.

The controller 130 may perform overall control on the internal components of the vehicle 1.

The controller 130 may control the communication device 120 to exchange various kinds of information with the terminal 2. Specifically, the controller 130 may control the communication device 120 to receive various kinds of information including the phone book information and the call history information from the terminal 2.

The controller 130 may create a user pattern based on the phone book information and the call history information received from the terminal 2. Specifically, the controller 130 may create a user pattern by extracting or collecting information required to determine characteristics of the call history of the user based on the phone book information and the call history information.

The user pattern may refer to information about a call pattern of the user, and in particular, to characteristic information of the call history of the user per time. The user pattern may include a name of the phone book information, categories by name, the number of calls by name, sending call time by name, receiving call time by name, sending call time of the categories by name, receiving call time of the categories by name, etc. The user pattern may further include various kinds of information required to determine a call pattern of the user, such as confidence scores by name, at least one threshold for the confidence scores by name, recommended actions by name, whether to perform the recommended actions by name, etc.

When a voice of the user is input through the voice input device 110, the controller 130 may control the communication device 120 to send the terminal 2 a command to control on a name corresponding to the input voice.

At this time, the controller 130 may control the communication device 120 to send the terminal 2 a command to send a call to the name corresponding to the voice of the user. The controller 130 may send the name corresponding to the voice of the user with a matched phone number, and send the command to send a call to the name to the terminal 2 through the communication device 120.

For this, the controller 130 may do a search for at least one name candidate corresponding to the voice of the user, and determine a threshold of a confidence score of the name candidate based on the user pattern. The controller 130 may select a name corresponding to the input voice from among the at least one name candidate based on the determined threshold. This will be described later in detail.

The controller 130 may be implemented with a memory (not shown) storing an algorithm to control operation of the components in the vehicle 1 or data about a program that implements the algorithm, and a processor (not shown) carrying out the aforementioned operation using the data stored in the memory. The memory and the processor may be implemented in separate chips. Alternatively, the memory and the processor may be implemented in a single chip.

The controller 130 may store various kinds of information such as phone book information and call history information received from the terminal 2, user patterns, etc.

Furthermore, the storage 140 may store various kinds of information regarding voice recognition, such as an acoustic model, a language model, word information, etc.

The storage 140 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 140 may be a memory implemented with a chip separate from the aforementioned processor in relation to the controller 130, or may be implemented integrally with the processor in a single chip.

At least one component may be added or omitted to correspond to the performance of the components of the vehicle 1 shown in FIG. 1. Furthermore, it will be obvious to the ordinary skilled people in the art that the relative positions of the components may be changed to correspond to the system performance or structure.

The components of the vehicle 100 shown in FIG. 1 may be implemented in software, or hardware such as Field Programmable Gate Arrays (FPGAs) and Application Specific Integrated Circuits (ASICs).

Operation of the controller 130 will now be described in detail.

Figure 3:
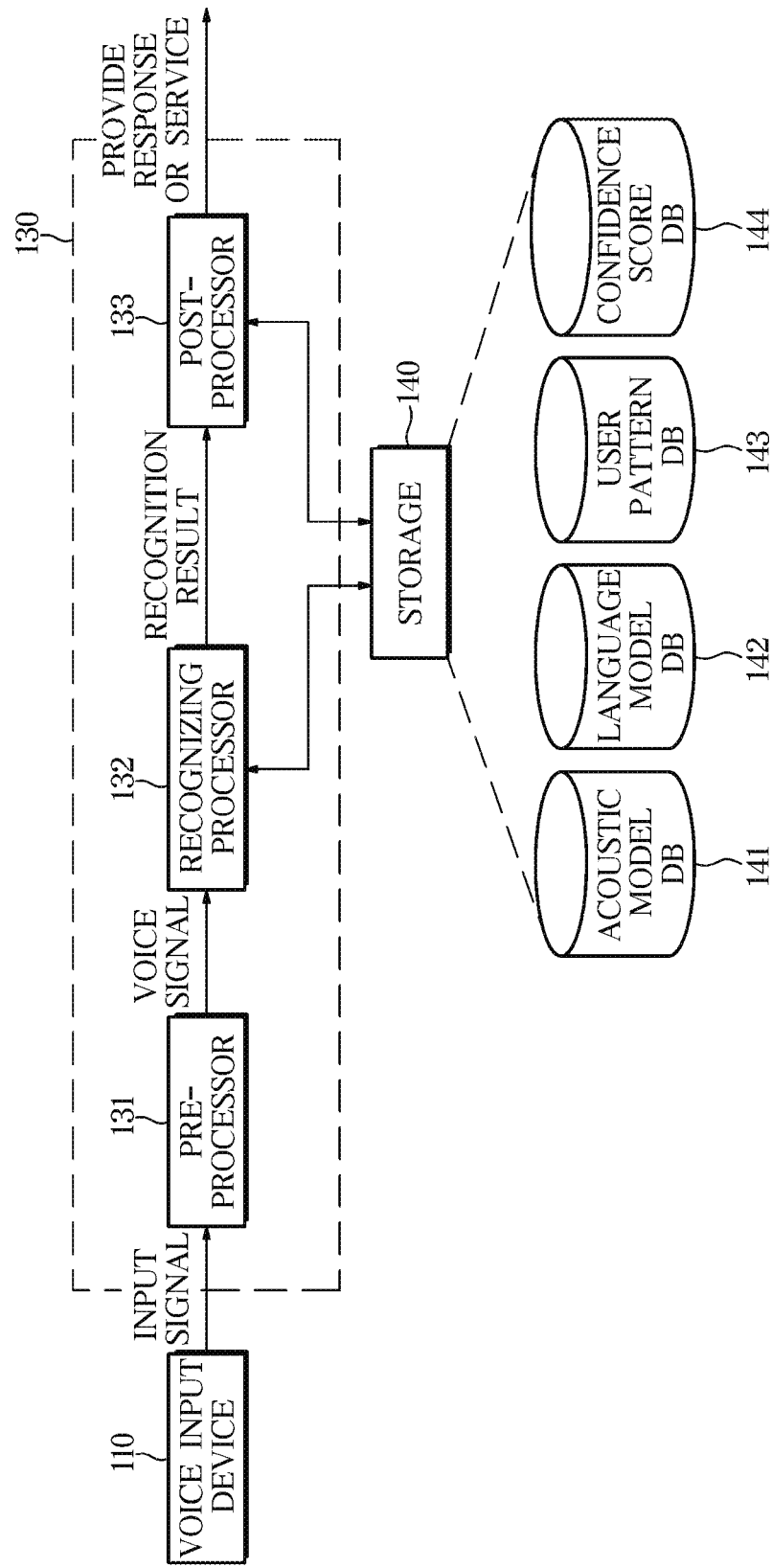
FIG. 3 is a diagram for explaining a controller, according to an embodiment of the present disclosure.

FIG. 3 is a diagram for explaining a controller, according to an embodiment of the present disclosure.

Referring to FIG. 3, the controller 130 may include one or more processors, which may include a pre-processor 131 for canceling noise from an input signal received from the voice input device 110, a voice recognizing processor 132 for recognizing an input voice of a user and outputting utterance in a text format, and a post-processor 133 for selecting a name corresponding to the voice of the user from among the recognition results.

The pre-processor 131, the voice recognizing processor 132, and the post-processor 133 each may be an electric circuitry that executes instructions of software which thereby performs various functions described hereinafter.

The pre-processor 131 of the one or more processors may perform noise cancellation on the input signal received from the voice input device 110. The pre-processor 131 may also cancel noise from an input signal through various signal processing such as signal amplification.

The pre-processor 131 may monitor an input signal sent from the voice input device 110 to determine whether a voice of a user is input.

Thus far, a Push to Talk (PTT) button has been manipulated to open a microphone or a trigger signal has been input by speaking an extra command to activate voice recognition, in order for the user to enter voices. In an embodiment of the present disclosure, the vehicle 1 has the voice input device 110 that is always open, and the pre-processor 131 may monitor a signal input through the voice input device 110 in real time to determine whether a voice of the user is input.

When it is determined that a voice of the user is input, the pre-processor 131 may cancel noise from the input signal and send a voice signal that was subjected to signal processing to the voice recognizing processor 132.

The voice recognizing processor 132 of the one or more processors may recognize the voice produced by the user from the input voice signal and output the recognition result.

The recognition result output from the voice recognizing processor 132 may be utterance in a text format.

For this, the voice recognizing processor 132 may include a speech recognition engine, which may apply a speech recognition algorithm to the input voice to recognize the voice produced by the user, and produce the recognition result.

The voice recognizing processor 132 may employ an acoustic model that models and compares signal characteristics of a voice, and a language model that models linguistic order relations of words or syllables. For this, the storage 140 may store an acoustic model database (DB) 141 and a language model DB 142.

A language model that models linguistic order relations of words or syllables may reduce acoustic ambiguity and errors in recognition by applying the order relations between units that constitute a language to units obtained from the voice recognition. The language model may include a statistical language model and a finite state automata (FSA) based model. As the statistical language model, a chain probability of words, such as Unigram, Bigram, Trigram, etc., is used.

The voice recognizing processor 132 may use any of the aforementioned methods in recognizing a voice. For example, an acoustic model with a hidden Markov model applied thereto may be used, or an N-best search method that combines the acoustic model and the language model may be used. The N-best search method may include searching up to N recognition result candidates using the acoustic model and the language model and reevaluating the priority of the candidates, thereby improving recognition performance.

The voice recognizing processor 132 may calculate a confidence score to secure confidence in the recognition result. The confidence score is a measure to indicate how reliable a voice recognition result is. For example, a recognition result, a phoneme or word, may be defined by a relative value to a probability of which the speech is produced from other phoneme or word. Accordingly, the confidence score may be represented with a value ranging from 0 to 1, or from 0 to 10,00, without being limited thereto.

Furthermore, the voice recognizing processor 132 may extract a name from the utterance in a text format, which is output from the voice of the user. In this case, the voice recognizing processor 132 may search for at least one name candidate for a name corresponding to the voice of the user, and the recognition result may include the at least one name candidate. The recognition result may further include a confidence score for the name candidate.

For example, with the aforementioned N-best search method, the voice recognizing processor 132 may search for up to N name candidates. The voice recognizing processor 132 may output recognition results by evaluating the priority of the N name candidates and calculate the confidence scores of the N name candidates.

The recognition results produced by the voice recognizing processor 132 may be sent to the post-processor 133 of the one or more processors. The post-processor 133 may select a name corresponding to the voice of the user from among the recognition results, and control the communication device 120 to send various control commands related to the selected name to the terminal 2.

For example, the post-processor 133 may control the communication device 120 to send the terminal 2 a command to send a call to the name corresponding to the voice of the user. The post-processor 133 may send the name corresponding to the voice of the user with a matched phone number, and send the command to send a call to the name to the terminal 2 through the communication device 120.

In this regard, the post-processor 133 may select a name corresponding to the voice of the user from among the at least one name candidates included in the recognition result.

Specifically, the post-processor 133 may select a name corresponding to the voice of the user from among the at least one name candidates included in the recognition results based on a preset threshold. The preset threshold may refer to at least one threshold for the confidence scores of the recognition result.

The post-processor 133 may store the at least one threshold in a confidence score DB 144. The thresholds for the recognition result may be stored for each name or user who inputs voice.

The post-processor 133 may select a name corresponding to the voice of the user from among name candidates whose confidence scores exceed a preset first threshold, thereby enabling an operation relating to the selected name to be performed. The first threshold may refer to a confidence score that secures the minimum confidence in the recognition result.

If there is no name candidate whose confidence score exceeds the first threshold among the at least one name candidate included in the recognition result, the post-processor 133 may reject the recognition result because no confidence in the recognition result is secured. That is, it may be determined to be a recognition failure. In this case, the post-processor 132 may ask the user through the display 152 or the speaker 151 to re-enter a voice.

Furthermore, if there is one name candidate whose confidence score exceeds the first threshold among the at least one name candidates included in the recognition result, the post-processor 133 may determine whether the confidence score of the name candidate exceeds a second threshold and select a name corresponding to the voice of the user based on the determination.

The second threshold may refer to a confidence score that secures the maximum confidence in the recognition result, which is higher than the first threshold.

Specifically, if a name candidate has a confidence score exceeding the first threshold and even the second threshold, the post-processor 133 may determine that the name candidate secures high confidence and select the name candidate as a name that corresponds to the input voice.

If a name candidate has a confidence score exceeding the first threshold but does not exceed the second threshold, the post-processor 133 may determine that the name candidate does not secure high confidence and ask the user in a visual way or audible way to confirm the name candidate.

In this regard, the post-processor 133 may control the display 152 or the speaker 151 to ask the user to confirm the information about the name candidate, and if the user confirms the name candidate, the post-processor 133 may select the name candidate as a name corresponding to the voice of the user.

If there are a plurality of name candidates whose confidence scores exceed the first threshold, the post-processor 133 may determine the priority of the plurality of name candidates based on their confidence scores. For example, the post-processor 133 may compare a difference in confidence score between a name candidate with a first priority and a name candidate with a second priority, and based on the comparison, select a name corresponding to the voice of the user.

The third threshold may refer to a threshold that secures confidence in the difference in confidence score between recognition results, and may have a confidence score lower than the first and second thresholds.

If the difference in confidence score between the name candidate with the first priority and the name candidate with the second priority exceeds the third threshold, it means that the confidence in the name candidate with the first priority is secured, so the post-processor 133 may select the name candidate with the first priority as a name that corresponds to the voice of the user.

If the difference in confidence score between the name candidate with the first priority and the name candidate with the second priority does not exceed the third threshold, it means that the confidence in the name candidate with the first priority is not secured, so the post-processor 133 may ask the user in a visual or audible way to confirm the name candidate with the first priority.

In other words, the post-processor 133 may select the name candidate with the first priority as a name corresponding to the voice of the user not immediately but after confirmation on the name candidate with the first priority is made by the user.

Furthermore, if the difference in confidence score between the name candidate with the first priority and the name candidate with the second priority does not exceed the third threshold, the post-processor 133 may determine whether there are a plurality of categories for the name candidate with the first priority.

If there are not the plurality of categories for the name candidate with the first priority, i.e., if the name candidate with the first priority has a single category, the post-processor 133 may ask the user in a visual or audible way to confirm the name candidate with the first priority.

In the case that the difference in confidence score between the name candidate with the first priority and the name candidate with the second priority does not exceed the third threshold, it means that the confidence in the name candidate with the first priority is not secured, so the post-processor 133 may not immediately select the name candidate with the first priority as a name corresponding to the voice of the user but ask the user for confirmation. The post-processor 133 may increase the accuracy of voice recognition by selecting the name candidate with the first priority as a name corresponding to the voice of the user when the confirmation is made by the user.

If there are the plurality of categories for the name candidate with the first priority, i.e., if the name candidate with the first priority have the plurality of categories, the post-processor 133 may determine a probability value of each of the plurality of categories based on the stored user pattern.

In this regard, the post-processor 133 may determine a probability value of each of the plurality of categories based on at least one of sending time or receiving time of categories by name in the user pattern.

The post-processor 133 may select a category having the highest probability value based on the probability values of the plurality of categories, and determine whether the probability value of the selected category exceeds a preset confidence score.

If the probability value of the selected category exceeds the preset confidence score, the post-processor 133 may perform control on the selected category. For example, the post-processor 133 may send a command to send a call to the phone number that matches the selected category of the name candidate with the first priority.

In this case, the post-processor 133 may send a more accurate command to send a call based on the user pattern that reflects call characteristics of the user. Accordingly, a more accurate calling function may be provided based on voice recognition, thereby increasing usability and comfort.

If the probability value of the selected category does not exceed the preset confidence score, the post-processor 133 may ask the user to select a category. In this case, the post-processor 133 does not immediately perform control on the selected category but may ask the user to select a category by displaying a preset number of category candidates for the user.

When a category is selected by the user, the post-processor 133 may perform control on the selected category. For example, the post-processor 133 may send a command to send a call to the phone number that matches the selected category for the name candidate with the first priority.

This may enable a more accurate user-voice recognition function to be provided, and with the increased success rate of voice recognition, user comfort may also be increased.

Furthermore, the post-processor 133 may change the preset threshold. Specifically, the post-processor 133 may determine at least one threshold based on a user pattern related to a call pattern of the user.

In this regard, the post-processor 133 may create a user pattern based on the phone book information and call history information of the terminal 2 and store the user pattern in a user pattern DB 143.

Specifically, the post-processor 133 may create a user pattern by extracting or collecting information required to determine characteristics of the call history of the user based on the phone book information and the call history information.

The user pattern may refer to information about a call pattern of the user, and in particular, to characteristic information of the call history of the user per time. The user pattern may include a name of the phone book information, categories by name, the number of calls by name, sending call time by name, receiving call time by name, sending call time of the categories by name, receiving call time of the categories by name, etc. The user pattern may further include various kinds of information required to determine a call pattern of the user, such as confidence scores by name, at least one threshold for the confidence scores by name, recommended actions by name, whether to perform the recommended actions by name, etc.

Furthermore, the post-processor 133 may search the phone book of the terminal 2 for at least one name candidate corresponding to the voice of a user, and change at least one threshold based on the number of the name candidates searched for. Specifically, the post-processor 133 may change at least one of the first, second, or third threshold.

More specifically, if the number of name candidates searched for does not exceed a preset first reference number, the post-processor 133 may increase the second threshold. There being equal to or less than the preset first reference number of name candidates searched for may mean that there is no similar name in the phone book. In this case, a probability of searching for an accurate name corresponding to the voice of the user may become higher than in an occasion when there are many similar names in the phone book. That is, it may be a situation having a high recognition rate. Accordingly, the post-processor 133 may reduce the number of name candidates included in the recognition results by increasing the second threshold, and may enable control on the selected name to be immediately performed. This may increase usability for the user.

If the number of name candidates searched for does not exceed the preset first reference number, the post-processor 133 may reduce the third threshold. In this case, the name candidate with the first priority may be selected without asking the user of confirmation even when the difference in confidence score between recognition results is small, thereby increasing usability for the user.

If the number of name candidates searched for is greater than the preset first reference number, the post-processor 133 may reduce at least one of the first and second thresholds. There being more than the preset first reference number of name candidates searched for may mean that there are many similar names in the phone book. In this case, a probability of searching for an accurate name corresponding to the voice of the user may become lower than in the occasion when there are little similar names in the phone book. That is, it may be a situation having a low recognition rate.

Accordingly, the post-processor 133 may increase the number of name candidates included in the recognition result by reducing at least one of the first and second thresholds, and may prevent immediate control on the selected name. This may increase the accuracy in voice recognition and the recognition rate.

If the number of name candidates searched for is greater than the preset first reference number, the post-processor 133 may increase the third threshold. In this case, the user may be asked for confirmation even when the difference in confidence score between recognition results is big, thereby increasing the accuracy in voice recognition and the recognition rate.

Furthermore, the post-processor 133 may determine the number of categories for a name candidate searched for in the phone book information of the terminal 2, and change at least one threshold based on the determined number of categories.

Specifically, if the number of categories for a name candidate searched for does not exceed a preset second reference number, the post-processor 133 may increase at least one of the first and second thresholds.

There being equal to or less than the preset second reference number of categories for a name candidate searched for may mean that there are little types of phone numbers matching the name. In this case, it may have a higher probability of providing a function that meets the user's needs than in an occasion when there are many kinds of phone numbers matching the name. That is, it may be a situation having a high recognition rate.

Accordingly, the post-processor 133 may reduce the number of name candidates included in the recognition result by increasing at least one of the first and second thresholds, and may promote immediate control on the selected name. This may increase comfort of the user.

If the number of categories for the name candidate searched for does not exceed the preset second reference number, the post-processor 133 may reduce the third threshold. In this case, the name candidate with the first priority may be selected without asking the user of confirmation even if the difference in confidence score between recognition results is small, thereby increasing comfort of the user.

If the number of categories for the name candidate searched for is greater than the preset second reference number, the post-processor 133 may reduce at least one of the first and second thresholds.

There being more than the preset second reference number of categories for the name candidate searched for may mean that there are many types of phone numbers matching the name. In this case, it may have a higher probability of providing a function that meets the user's needs than in an occasion when there are small kinds of phone numbers matching the name. That is, it may be a situation having a low recognition rate.

Accordingly, the post-processor 133 may increase the number of name candidates included in the recognition results by reducing at least one of the first and second thresholds. The post-processor 133 may increase the accuracy in voice recognition and the recognition rate by not immediately performing control on the selected name but asking the user for confirmation.

If the number of categories for the name candidate searched for is greater than the preset second reference number, the post-processor 133 may increase the third threshold. In this case, the user may be asked for confirmation even when the difference in confidence score between recognition results is big, and a name candidate confirmed by the user may be selected. This may increase the accuracy in voice recognition and the recognition rate.

The post-processor 133 may update at least one threshold that is changed by storing the threshold in the confidence score DB 144. Furthermore, the post-processor 133 may create a user pattern for the changed threshold, or update a stored user pattern by changing a threshold included in the user pattern to the changed threshold.

The pre-processor 131, the voice recognizing processor 132, and the post-processor 133 may each include a separate memory and processor, or may share some memories and processors among them.

The memory and processor may be used in the plural, in which case, the plurality of memories and processors may be integrated in a single chip or arranged in physically separate locations.

At least one component may be added or omitted to correspond to the performance of the components of the controller 130 shown in FIG. 3. Furthermore, it will be obvious to the ordinary skilled people in the art that the relative positions of the components may be changed to correspond to the system performance or structure.

FIG. 4 shows exemplary recognition results, according to an embodiment of the present disclosure.

Referring to FIG. 4, when a user speaks "call James", the controller 130 may extract 'James' from the voice of the user.

The controller 130 may search for at least one name candidate of 'James' spoken by the user and calculate confidence scores of the respective name candidates.

The controller 130 may select a name corresponding to the voice of the user from among the name candidates (James, Jason, Jameson, Jaden, Jane, Mason, and Jeremy) whose confidence scores exceed a preset first threshold $T1$ and exclude name candidates (Jade, Johnson, and John) whose confidence scores do not exceed the first threshold $T1$ from the recognition results. The first threshold $T1$ may have a value between confidence values $X8$ and $X7$.

As there are a plurality of name candidates whose confidence scores exceed the preset first threshold $T1$, the controller 130 may determine whether a difference in confidence score between a name candidate with the first priority, James, and a name candidate with the second priority, Jason, exceeds a third threshold $T3$.

When the difference in confidence score between the name candidate with the first priority, James, and the name candidate with the second priority, Jason, exceeds the third threshold $T3$, the controller 130 may determine whether to ask for confirmation of the user according to whether the confidence score of the name candidate with the first priority, James, exceeds a second threshold $T2$.

When the confidence score of the name candidate with the first priority, James, exceeds the second threshold T2, the name candidate with the first priority, James, may be selected as the name corresponding to the voice of the user.

The controller 130 may send a command to send a call to the selected name, James, to the communication device 120 so as to make a call to a number matching 'James'.

On the other hand, when the confidence score of the name candidate with the first priority, James, does not exceed the second threshold T2, it means that confidence in selecting the name candidate with the first priority, James, is not secured, so the controller 130 may ask the user to confirm the name candidate with the first priority, James.

When the difference in confidence score between the name candidate with the first priority, James, and the name candidate with the second priority, Jason, does not exceed the third threshold T3, the controller 130 may ask the user in a visual or audible way, to confirm the name candidate with the first priority, James. Accordingly, in an occasion when the confidence is not secured, the controller 130 may increase the accuracy in voice recognition by duly asking for confirmation of the user.

FIG. 5 shows exemplary recognition results, according to an embodiment of the present disclosure.

Referring to FIG. 5, when a user speaks "call James", the controller 130 may extract 'James' from the voice of the user. The controller 130 may search for at least one name candidate of 'James' spoken by the user and calculate confidence scores of the respective name candidates.

In at least one of the occasions when the number of at least one name candidate corresponding to 'James' in the phone book information of the terminal 2 does not exceed a preset first number, and when the number of categories for the name candidate searched for does not exceed a preset second number, the controller 130 may increase the first and second thresholds T1 and T2 and reduce the third threshold T3.

The controller 130 may increase the number of name candidates to be left out from two (Johnson and John) to five (Mason, Jeremy, Jade, Johnson, and John) by increasing the first threshold T1. In other words, the controller 130 may reduce the number of name candidates to be considered.

Furthermore, the controller 130 may facilitate immediate control on the selected name by increasing the second threshold T2. For example, when the user is under a condition having a high recognition rate, control on a selected name may be performed without confirmation of the user.

Furthermore, the controller 130 may facilitate immediate control on the selected name even when the difference in confidence score between the name candidate with the first priority and the name candidate with the second priority is small, by reducing the third threshold T3. In this case, the name candidate with the first priority may be selected without asking the user of confirmation even when the difference in confidence score between recognition results is small, thereby increasing usability for the user.

This may enable the controller 130 to detect the user being under a condition having a relatively high recognition rate and increase the processing speed of voice recognition. Accordingly, more accurate and quick voice recognition may be implemented.

FIG. 6 shows exemplary user patterns, according to an embodiment of the present disclosure.

Referring to FIG. 6, when a user inputs voice, the controller 130 may create a user pattern with a selected name in response to the input voice.

The controller 130 may include and store pieces of information in the user pattern, which have been used as a basis for control while the user uses the voice recognition function. For example, the controller 130 may include pieces of information in the user pattern, which have been used to select names corresponding to input user voices.

For example, the controller 130 may store a user pattern for a selected name 'HongGildong', the user pattern including category information, e.g., mobile, a confidence score, e.g., 5100, the first threshold, e.g., 3000, the second threshold, e.g., 5000, and the third threshold, e.g., 500. The user pattern may be created to further include a recommended action, e.g., direct call, and whether to perform the action, e.g., yes.

In this case, the recommended action may indicate a type of a control command generated by the controller 130, which may include an occasion when a command to send a call to the selected name is generated without asking for confirmation of the user, e.g., Direct Call, an occasion when a command to send a call to a name is generated after the name is confirmed by the user, e.g., Confirmation Call, and an occasion when a command to send a call to a selected name is generated after asking the user to select the name from among a plurality of candidates, e.g., N-best Call.

Furthermore, the controller 130 may create user patterns for the selected name, e.g., HongGildong, whenever the user uses the voice recognition function, build a database with the user patterns, and use the database in determining thresholds in the future. Accordingly, a voice recognition function that is suitable for an environment of each person may be provided.

Figure 7:
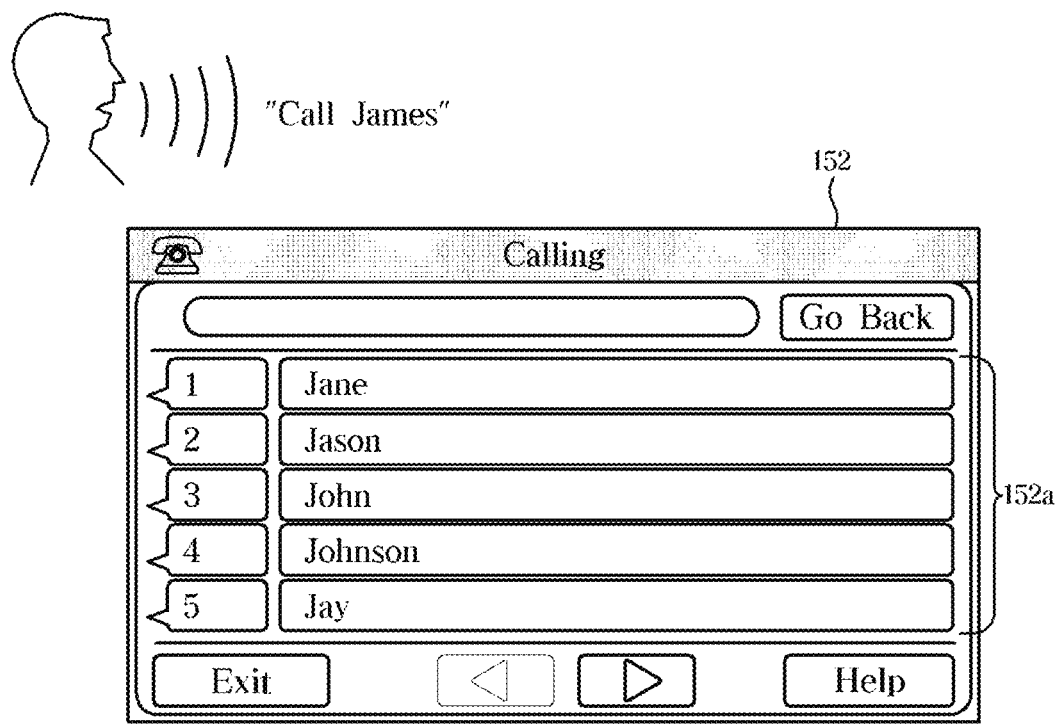
FIGS. 7 to 8 show exemplary screens displayed on a display, according to an embodiment of the present disclosure.

FIG. 7 shows an exemplary screen displayed on a display, according to an embodiment of the present disclosure.

Referring to FIG. 7, when a voice, e.g., "call James", is input from the user, the controller 130 may ask the user to select a name by displaying at least one name candidate 152a corresponding to the spoken name, James, of the input voice. The user may select one of the name candidates 152a, and upon reception of a name corresponding to the voice of the user from the user, the controller 130 may send a control command on the selected name to the communication device 120. Specifically, the controller 130 may send a command to send a call to the selected name to the communication device 120.

Furthermore, the controller 130 may ask not only for selection of a name corresponding to the voice of the user but also for selection of a category for the name.

Specifically, the controller 130 may ask the user to select a category when a probability value of the category for the name corresponding to the voice of the user does not exceed a preset confidence score. In this case, the controller 130 may ask the user to select a category by displaying a preset number of category candidates for the user.

When a category is selected by the user, the controller 130 may perform control on the selected category. For example, the controller 130 may send a command to send a call to a phone number that matches the selected category.

Figure 8:
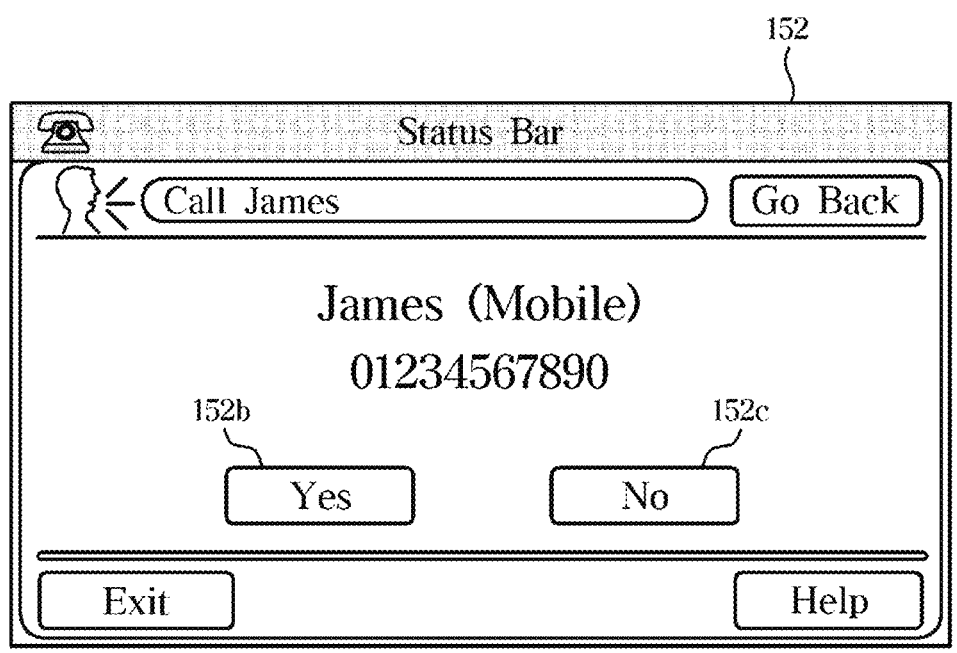

FIG. 8 shows another exemplary screen displayed on a display, according to an embodiment of the present disclosure.

Referring to FIG. 8, the controller 130 may ask the user in a visual manner to confirm a name candidate, e.g., James, corresponding to the voice of the user, e.g., "call James". The controller 130 may ask the user to confirm the selected name candidate, e.g., James, by displaying information about the name candidate. The information about the selected name candidate, e.g., James, may include the name, e.g., James, a category, e.g., mobile, and a phone number, e.g., 01234567890.

When the displayed name corresponds to the name in the input voice, the user may or may not confirm the name candidate through a confirmation interface 152b or non-confirmation interface 152c displayed on the display 152.

When the user confirms the name candidate, the name candidate may be selected as a name corresponding to the voice of the user and control is performed on the selected name. For example, the controller 130 may send a command to send a call to a phone number that matches the selected name.

Figure 9:
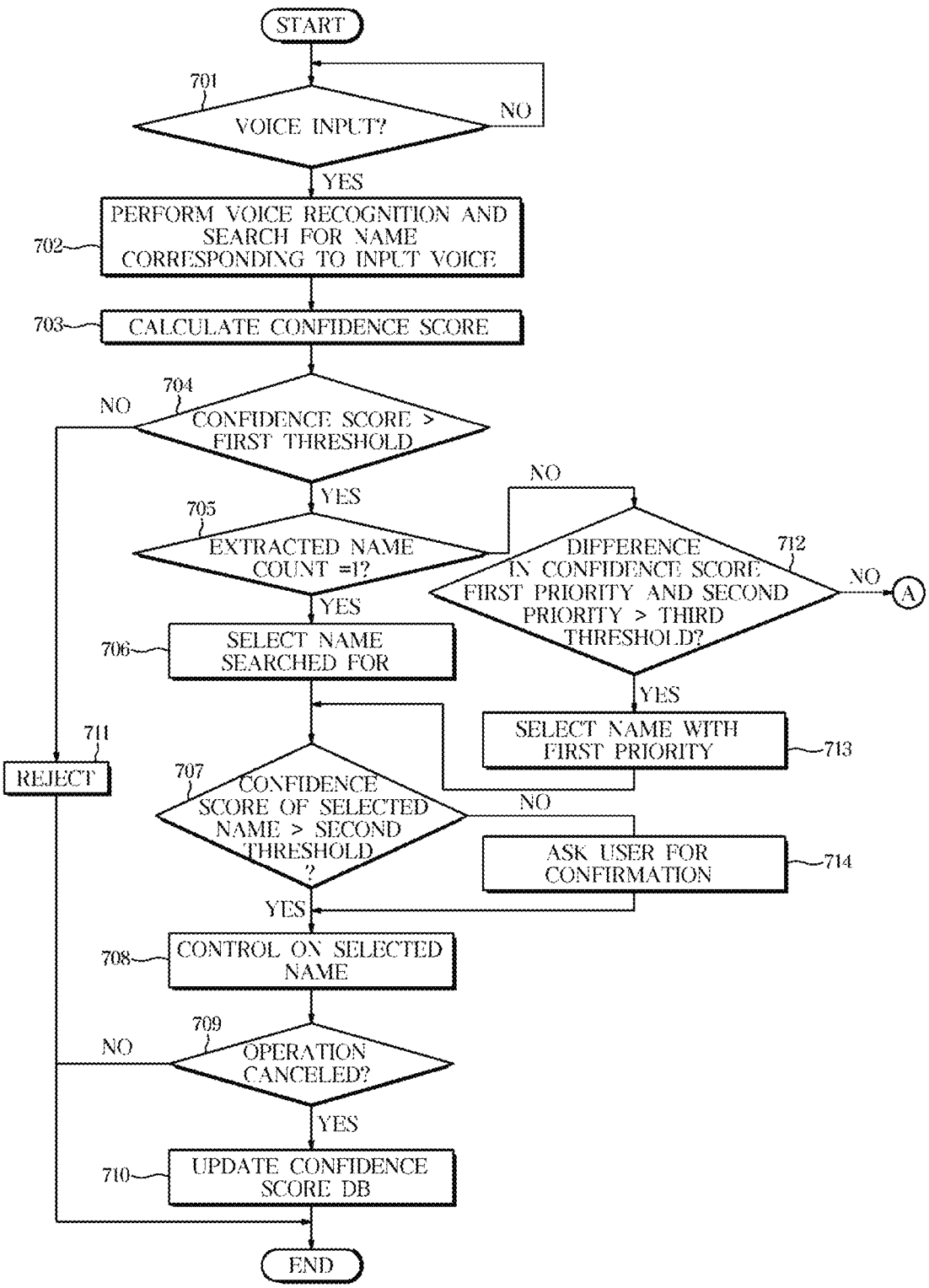
FIGS. 9 and 10 are flowcharts illustrating a control method of a vehicle, according to an embodiment of the present disclosure.

FIG. 9 is a flowchart illustrating a control method of a vehicle, according to an embodiment of the present disclosure.

Referring to FIG. 9, in an embodiment, the vehicle 1 determines whether a voice is input from a user, in 701.

When it is determined that a voice is input from a user (yes in 701), the vehicle 1 performs voice recognition and searches for a name corresponding to the input voice, in 702. Specifically, the vehicle 1 may search for at least one name candidates corresponding to the input voice.

The vehicle 1 calculates a confidence score of each of the at least one name candidate, in 703. For example, the vehicle 1 may search for up to N name candidates by using an N-best search method. The vehicle 1 may evaluate the priority of the N name candidates and output the recognition results, and calculate the confidence scores of the N name candidates.

Subsequently, the vehicle 1 determines whether a confidence score of each name candidate exceeds a preset first threshold and determines whether there is a name candidate whose confidence score exceeds the first threshold among the name candidates searched for, in 704. The first threshold may refer to a confidence score that secures the minimum confidence in the recognition result.

When there is a name candidate whose confidence score exceeds the first threshold among the name candidates searched for (yes in 704), the vehicle 1 extracts a name candidate whose confidence score exceeds the present first threshold among the name candidates searched for and determines whether the number of the extracted name candidates is 1, in 705.

When it is determined that there is one name candidate whose confidence score exceeds the first threshold among the at least one name candidates included in the recognition results (yes in 705), the vehicle 1 selects the name candidate searched for as a name corresponding to the voice of the user, in 706, and determines whether the confidence score of the selected name candidate exceeds a second threshold, in 707.

The second threshold may refer to a confidence score that secures the maximum confidence in the recognition result, which is higher than the first threshold.

When the confidence score of the selected name candidate exceeds the second threshold (yes in 707), the vehicle 1 performs control on the selected name, in 708. Specifically, the vehicle 1 may perform operation of sending a call to the selected name by sending a command to send a call to the selected name to the terminal 2.

Subsequently, the vehicle 1 determines whether an operation that follows the control command on the selected name is canceled in 709, and when the operation is canceled (yes in 709), updates the confidence score DB in 710.

Specifically, the vehicle 1 may change a confidence score of the recognition result stored in the confidence score DB. For example, in a case that the operation is canceled by the user, it may be interpreted that there is an error in the recognition result and thus the confidence score of the recognition result may be reduced. This may improve the accuracy in voice recognition of the vehicle 1.

In another example, when the confidence score of the selected name candidate does not exceed the second threshold (no in 707), the vehicle 1 asks for confirmation of the user on the selected name, in 714.

When the user confirms the name candidate, the vehicle 1 may select the name candidate as a name corresponding to the voice of the user. The vehicle 1 then performs operations in 708 to 710, which are the same as what are described above.

In another example, when there is no name candidate whose confidence score exceeds the first threshold among the name candidates searched for (no in 704), confidence in the recognition result may not be secured, so the vehicle 1 rejects the recognition result in 711. That is, it may be determined to be a recognition failure. In this case, the vehicle 1 may ask the user through the display 152 or the speaker 151 to re-enter a voice.

In another example, when there are a plurality of name candidates whose confidence scores exceed the first threshold among the at least one name candidates included in the recognition result (no in 705), the vehicle determines the priority of the plurality of name candidates based on their confidence scores, and determines whether the difference in confidence score between name candidates with first and second priorities among the plurality of name candidates exceeds a third threshold, in 712.

The third threshold may refer to a threshold that secures confidence in the difference in confidence score between recognition results, and may have a confidence score lower than the first and second thresholds.

When the difference in confidence score between the name candidate with the first priority and the name candidate with the second priority among the plurality of name candidates exceeds the third threshold (yes in 712), it means that the confidence score of the name candidate with the first priority is secured, so the vehicle 1 selects the name candidate with the first priority as a name that corresponds to the voice of the user, in 713. The vehicle 1 then performs operations in 708 to 710, which are the same as what are described above.

In another example, operation of the vehicle 1 when the difference in confidence score between the name candidate with the first priority and the name candidate with the second priority among the plurality of name candidates does not exceed the third threshold (no in 712) will now be described in connection with FIG. 10.

Figure 10:
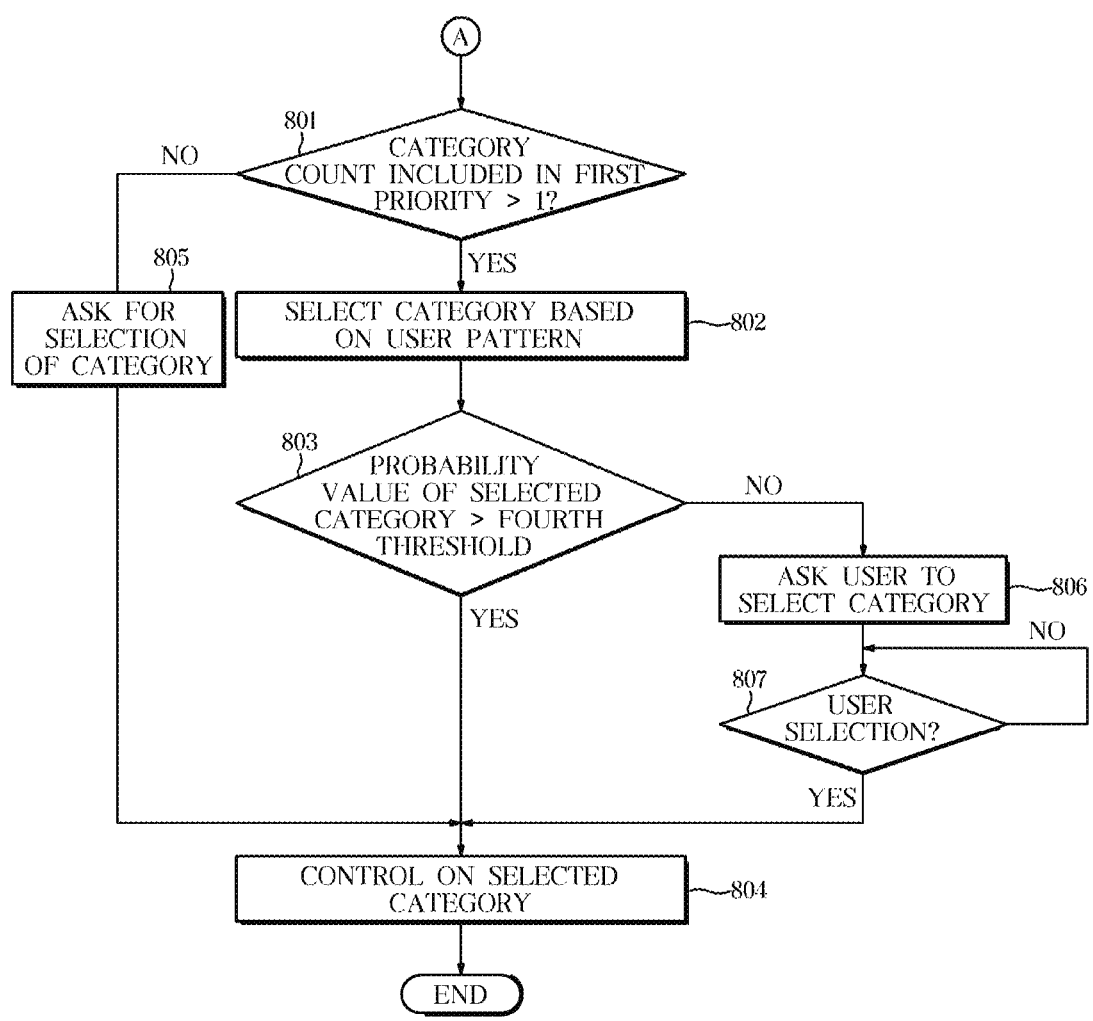

FIG. 10 is a flowchart illustrating a control method of a vehicle, according to an embodiment of the present disclosure.

Referring to FIG. 10, when the difference in confidence score between the name candidate with the first priority and the name candidate with the second priority among the plurality of name candidates does not exceed the third threshold (yes in 712 of FIG. 9), the vehicle 1 determines whether there are a plurality of categories for the name candidate with the first priority, in 801.

The categories refer to types of phone numbers, and may have at least one of 'mobile', 'home', and 'office'.

When there are a plurality of categories for the name candidate with the first priority (yes in 801), the vehicle 1 selects a category based on the user pattern, in 802.

Specifically, the vehicle 1 may determine a probability value of each of the plurality of categories based on at least one of sending time or receiving time of categories by name in the user pattern. The vehicle 1 may select a category having the highest probability value based on probability values of the plurality of categories.

The vehicle 1 then determines whether the probability value of the selected category exceeds a fourth threshold, in 803. The fourth threshold may refer to a preset confidence score, which may be stored in the confidence score DB 144.

When the probability value of the selected category exceeds the fourth threshold (yes in 803), the vehicle 1 performs control on the selected category, in 804. For example, the vehicle 1 may send a command to send a call to the phone number that matches the selected category of the name candidate with the first priority.

In this case, the vehicle 1 may send a more accurate command to send a call based on the user pattern that reflects call characteristics of the user. Accordingly, a more accurate calling function may be provided based on voice recognition, thereby increasing usability and comfort.

In another example, when the probability value of the selected category does not exceed the fourth threshold (no in 803), the vehicle 1 asks the user to select a category, in 806. In this case, the vehicle 1 does not immediately perform control on the selected category, but may ask the user to select a category by displaying a preset number of category candidates for the user.

The vehicle 1 determines whether the selection of a category is received from the user in 807, and when the selection of a category is received from the user (yes in 807), performs control on the selected category. For example, the vehicle 1 may send a command to send a call to the phone number that matches the selected category of the name candidate with the first priority.

This may enable a more accurate user-voice recognition function to be provided, and with the increased success rate of voice recognition, user comfort may also be increased.

In another example, when there are not a plurality of categories for the name candidate with the first priority (no in 801), the vehicle 1 asks the user to select a category, in 805. In this case, the vehicle 1 does not immediately perform control on the selected category, but may ask the user to select a category by displaying a preset number of category candidates for the user.

When a category is selected by the user, the vehicle 1 may perform control on the selected category. For example, the vehicle 1 may send a command to send a call to the phone number that matches the selected category of the name candidate with the first priority.

This may enable a more accurate user-voice recognition function to be provided, and with the increased success rate of voice recognition, user comfort may also be increased.

According to embodiments of the present disclosure, a vehicle and control method thereof may provide a more accurate and quick voice recognition function, thereby increasing convenience for the user.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
a communication device configured to communicate with a terminal capable of providing a communication function;
a sensor configured to receive voice of a user;
a storage configured to store a user pattern related to a call pattern of the user; and
a controller configured to:
  search for at least one name candidate corresponding to an input voice when receiving the input voice,
  change a preset threshold for a confidence score of the at least one name candidate based on the user pattern to a changed threshold, and
  select a name corresponding to the input voice from among the at least one name candidate based on the changed threshold,
wherein the controller is further configured to select a name corresponding to the input voice from among name candidates, each of which has a confidence score exceeding a first threshold, wherein:
  when there is one name candidate with a confidence score exceeding the first threshold, the controller is configured to determine whether the confidence score of the one name candidate exceeds a second threshold, and when the confidence score of the one name candidate exceeds the second threshold, the controller is configured to select the one name candidate as a name corresponding to the input voice, and
  when there are a plurality of name candidates each having a confidence score exceeding the first threshold and not exceeding the second threshold, the controller is configured to ask the user to confirm the plurality of name candidates.

2. The vehicle of claim 1, wherein the controller is configured to receive phone book information and call history information from the terminal, and create a user pattern based on the received phone book information and call history information.

3. The vehicle of claim 1, wherein when there are a plurality of name candidates, each of which has a confidence score exceeding the first threshold, the controller is configured to:
determine priorities of the plurality of name candidates based on confidence scores of the plurality of name candidates,
compare a difference in confidence score between a name candidate with a first priority and a name candidate with a second priority to a third threshold, and
select a name corresponding to the input voice based on the comparison.

4. The vehicle of claim 3, wherein the controller is configured to, when the difference in confidence score between the name candidate with the first priority and the name candidate with the second priority exceeds the third threshold, select the name candidate with the first priority as a name corresponding to the input voice.

5. The vehicle of claim 3, wherein the controller is configured to, when the difference in confidence score between the name candidate with the first priority and the name candidate with the second priority does not exceed the third threshold, ask the user to confirm the name candidate with the first priority.

6. The vehicle of claim 1, wherein the controller is configured to search the phone book information of the terminal, when the phone book information is received, for at least one name candidate corresponding to the input voice, and change at least one of a first threshold, a second threshold, or a third threshold based on the number of the at least one name candidate searched for.

7. The vehicle of claim 6, wherein the controller is configured to, when the number of the at least one name candidate searched for does not exceed a preset first reference number, increase the second threshold and reduce the third threshold.

8. The vehicle of claim 6, wherein the controller is configured to determine the number of categories for the at least one name candidate searched for from the phone book information, and change at least one of the first, second, or third thresholds based on the number of categories.

9. The vehicle of claim 8, wherein the controller is configured to, when the number of the categories does not exceed a preset second reference number, increase the second threshold and reduce the third threshold.

10. The vehicle of claim 1, wherein the controller is configured to control the communication device to send a control command on the selected name to the terminal.

11. A control method of a vehicle, the control method comprising:
    receiving, by a sensor, voice of a user;
    searching, by a controller, for at least one name candidate corresponding to an input voice when receiving the input voice;
    changing, by the controller, a preset threshold for a confidence score of the at least one name candidate based on a user pattern to a changed threshold; and
    selecting, by the controller, a name corresponding to the input voice from among the at least one name candidate based on the changed threshold,
    wherein the selecting a name corresponding to the input voice from among the at least one name candidate based on the changed threshold comprises:
        when there is one name candidate with a confidence score exceeding the first threshold, determining whether the confidence score of the one name candidate exceeds a second threshold, and when the confidence score of the one name candidate exceeds the second threshold, selecting the one name candidate as a name corresponding to the input voice; and
        when there are a plurality of name candidates each having a confidence score exceeding the first threshold and not exceeding the second threshold, asking the user to confirm the plurality of name candidates.

12. The control method of claim 11, further comprising receiving, by the controller, phone book information and call history information from a terminal, and creating, by the controller, a user pattern based on the received phone book information and call history information.

13. The control method of claim 11, wherein the selecting a name corresponding to the input voice from among the at least one name candidate based on the changed threshold comprises:
    when there are a plurality of name candidates, each of which has a confidence score exceeding the first threshold, determining priorities of the plurality of name candidates based on the confidence scores of the plurality of name candidates;
    comparing a difference in confidence score between a name candidate with a first priority and a name candidate with a second priority to a third threshold; and
    selecting a name corresponding to the input voice based on the comparison.

14. The control method of claim 13, wherein the selecting a name corresponding to the input voice from among the at least one name candidate based on the changed threshold comprises
    when the difference in confidence score between the name candidate with the first priority and the name candidate with the second priority exceeds the third threshold, selecting the name candidate with the first priority as a name corresponding to the input voice.

15. The control method of claim 13, wherein the selecting a name corresponding to the input voice from among the at least one name candidate based on the changed threshold comprises
    when the difference in confidence score between the name candidate with the first priority and the name candidate with the second priority does not exceed the third threshold, asking the user to confirm the name candidate with the first priority.

16. The control method of claim 11, wherein the searching for at least one name candidate comprises:
    searching phone book information of the terminal, when the phone book information is received, for at least one name candidate corresponding to the input voice;
    determining a threshold for a confidence score of the at least one name candidate based on a user pattern; and
    changing at least one of a first threshold, a second threshold, or a third threshold based on the number of the at least one name candidate searched for.

17. The control method of claim 16, wherein the changing at least one of a first threshold, a second threshold, or a third threshold based on the number of the at least one name candidate searched for comprises
    when the number of the at least one name candidate searched for does not exceed a preset first reference number, increasing the second threshold and reducing the third threshold.

18. The control method of claim 16, wherein the determining a threshold for a confidence score of the at least one name candidate based on a user pattern comprises
    determining the number of categories for the name candidate searched for from the phone book information, and changing at least one of the first, second, or third thresholds based on the number of categories.

19. The control method of claim 18, wherein the changing at least one of a first threshold, a second threshold, or a third threshold comprises
    when the number of categories does not exceed a preset second reference number, increasing the second threshold and reducing the third threshold.

20. The control method of claim 11, further comprising sending a control command on the selected name to the terminal.

* * * * *